United States Patent
Shibasaki

(10) Patent No.: US 7,130,067 B1
(45) Date of Patent: Oct. 31, 2006

(54) IMAGE DATA MANAGEMENT SYSTEM FOR IMAGE PROCESSING

(75) Inventor: Naoji Shibasaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/527,467

(22) Filed: Mar. 17, 2000

(30) Foreign Application Priority Data

Mar. 17, 1999 (JP) ................. 11/071899

(51) Int. Cl.
*G06F 3/12* (2006.01)
*G06K 15/00* (2006.01)

(52) U.S. Cl. ..................... 358/1.15; 358/1.18

(58) Field of Classification Search ............. 358/1.15, 358/1.6, 1.13, 1.16, 1.18; 707/10, 102, 513, 707/4, 3, 2; 709/201
See application file for complete search history.

(56) References Cited

U.S. PATENT DOCUMENTS

| | | | |
|---|---|---|---|
| 5,666,215 A | | 9/1997 | Fredlund et al. |
| 5,835,816 A | | 11/1998 | Sawada et al. |
| 5,995,771 A | | 11/1999 | Miyawaki |
| 6,035,323 A | * | 3/2000 | Narayen et al. ............. 709/201 |
| 6,195,694 B1 | * | 2/2001 | Chen et al. .................. 709/220 |
| 6,249,806 B1 | * | 6/2001 | Kohda et al. ................ 709/206 |
| 6,401,085 B1 | * | 6/2002 | Gershman et al. ............. 707/4 |
| 6,519,596 B1 | * | 2/2003 | Hoyt et al. .................... 707/10 |

FOREIGN PATENT DOCUMENTS

| | | |
|---|---|---|
| EP | 0856972 A2 | 8/1998 |
| EP | 0860980 A2 | 8/1998 |
| EP | 0961214 A2 | 12/1999 |
| JP | 10341303 A | 12/1998 |
| WO | WO 9605564 A1 | 2/1996 |
| WO | WO 98/10358 A1 | 3/1998 |
| WO | WO 98/30019 A1 | 7/1998 |

\* cited by examiner

*Primary Examiner*—Douglas Q. Tran
(74) *Attorney, Agent, or Firm*—Sughrue Mion, PLLC

(57) ABSTRACT

The object of the system according to the present invention is to relieve the user from the burden of printing and storing image data from a digital camera and to effectively utilize the image data. The system comprises a plurality of printing stations with functions to read digital image data, to print the data by performing necessary image processing and to transmit or receive the image data, a management system connected to each printing station via a network and used for identifying management data of each printing station and for distributing necessary data to each printing station, and a server for turning the image data being transmitted from each printing station to the management system to database and to store the data.

8 Claims, 3 Drawing Sheets

FIG. 4
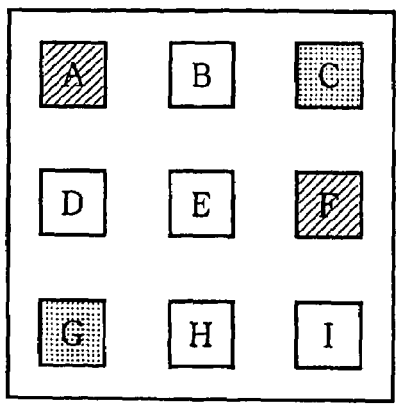
FIG. 5(a)
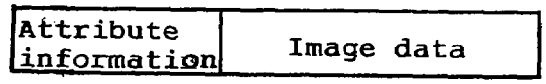
FIG. 5(b)
| Attribute information |
|---|
| Name<br>Age<br>Sex<br>Occupation<br>Address<br>Telephone number<br>Category of image<br>Date of photographing<br>Place of photographing<br>Permissibility for disclosure to public |
FIG. 6
| Printing station | Status | Software used | Operating conditions |
|---|---|---|---|
| 1 | $a_1$ | $b_1$ | $c_1$ |
| 2 | $a_2$ | $b_2$ | $c_2$ |
| ⋮ | ⋮ | ⋮ | ⋮ |
| n | $a_n$ | $b_n$ | $c_n$ |

IMAGE DATA MANAGEMENT SYSTEM FOR IMAGE PROCESSING

BACKGROUND OF THE INVENTION

The present invention relates to a management system for effectively storing, outputting and utilizing image data photographed by means such as a digital camera.

In recent years, digital cameras have been rapidly propagated, and an image produced by a heat sublimation transfer printer has picture quality as high as a picture obtained by silver salt photography. On the other hand, personal computers have been propagated and are now generally used in each private home, and it is now possible for users to incorporate data from the digital camera into the personal computer and to print out the image by themselves. However, the printers to provide images of high quality are expensive, and many of the users are not yet fully familiarized with the operation of personal computers. Under such circumstances, there have appeared specialty stores for providing services to print out from the media where data from digital camera are stored, or there are also unmanned self-service printing stations. A new type of such printing station has been proposed (Japanese Patent Publication Laid-Open 10-341303), which has the functions to settle the charge paid in cash or using card. When a predetermined amount of money is paid, image data are read from a medium where data from the digital camera are stored or directly from the digital camera, and the data are displayed on a monitor. Then, necessary image data are specified and printed out, or when it is necessary to have an image of high quality, the image data are transmitted to the specialty store via a network, and the obtained prints are sent to the users by a commercial delivery service.

In the conventional type printing station of the patent as described above, it is disclosed that the image data from the digital camera are read and are printed out, while there is no description on such features that the read image data are placed under management and are effectively utilized. Many of the users who have a digital camera not only cannot print out the images by themselves but also cannot perform good management for the data of the photographed image.

To solve the problems as described above, it is an object of the present invention to provide a system, by which it is possible to relieve the user from the burden to print and store image data of the digital camera and to effectively utilize the image data.

The image data management system according to the present invention comprises a plurality of printing stations with functions to read digital image data, to print the data by performing necessary image processing and to transmit or receive the image data, a management system connected to each printing station via a network and used for identifying management data of each printing station and for distributing necessary data to each printing station, and a server for turning the image data (being transmitted from each printing station to the management system) to a database and for storing the data.

Further, the present invention provides an image data management system as described above, wherein the image data turned to a database has image categories as attribute information.

Also, the present invention provides an image data management system as described above, wherein the image data turned to a database contains information for public disclosure of the image as attribute information.

Further, the present invention provides an image data management system as described above, wherein the management system performs remote-controlled maintenance on each printing station based on a management data.

Also, the present invention provides an image data management system as described above, wherein, in the printing station, the user can specify an image to be printed as well as an image to be transferred to and stored in the management system from the images displayed on a monitor screen.

Further, the present invention provides an image data management system as described above, wherein the printing station comprises a photographing equipment and a photograph for certification purposes can be prepared.

BRIEF DESCRIPTION OF THE DRAWINGS

FIG. 4 is a drawing to show a monitor screen;

FIG. 5(a) and FIG. 5(b) are to explain image data structure; and

FIG. 6 is a diagram to explain management data of the printing station.

DETAILED DESCRIPTION OF THE PREFERRED EMBODIMENT

Description will be given below on an embodiment of the present invention.

Figure 1:
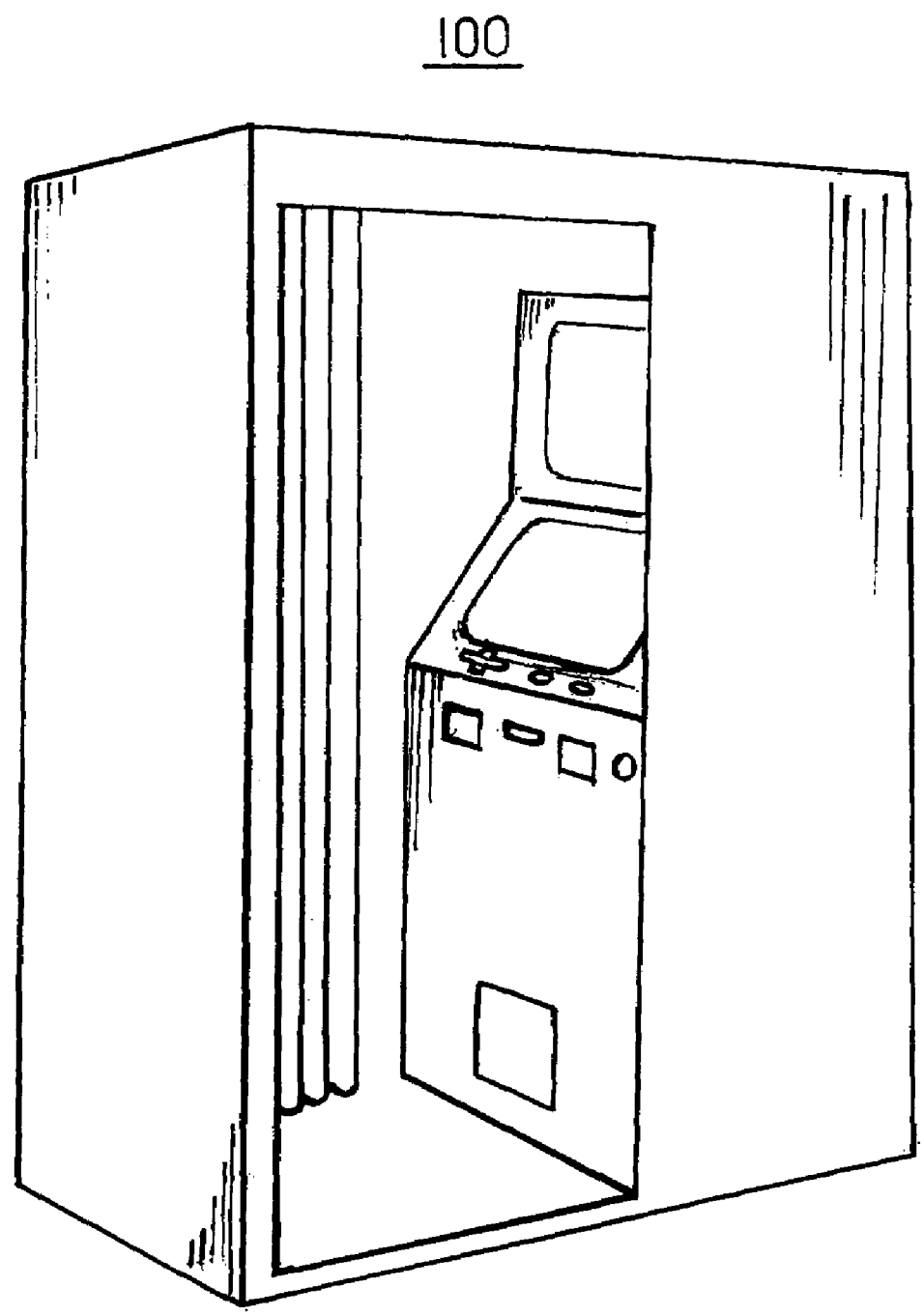
FIG. 1 is a conceptual drawing of a printing station according to the present invention.

FIG. 1 is a conceptual drawing of a printing station according to the present invention.

A printing station 100 is installed at an adequate place such as railway stations, public facilities, convenience stores, etc., and each printing station comprises a computer for performing various types of data processing such as processing of charges, reading of the image data, processing of the image data thus read, communication processing, and outputting of the data, a monitor screen, a touch panel, a plurality of printers for outputting the image, a printer for printing receipts, a scanner, etc. When a user gives a predetermined amount of fee into this device or pays the fee using a payment card, image data are read from storage medium in the digital camera and the data are displayed on the monitor screen. Then, an image specified on the touch panel is printed out and a receipt for the received amount of fee is issued. As to be described later, the image data thus read can be transferred via a network. Also, a camera and an illuminating equipment are installed on the printing station, and the photographed image is displayed on the monitor screen and is printed out, and a photograph to be used for certification purpose can also be prepared. In order that any user can perform this processing by simple operation procedure and in cheerful and pleasant manner, the printing station has various functions to provide audio guidance or sound effects.

Figure 2:
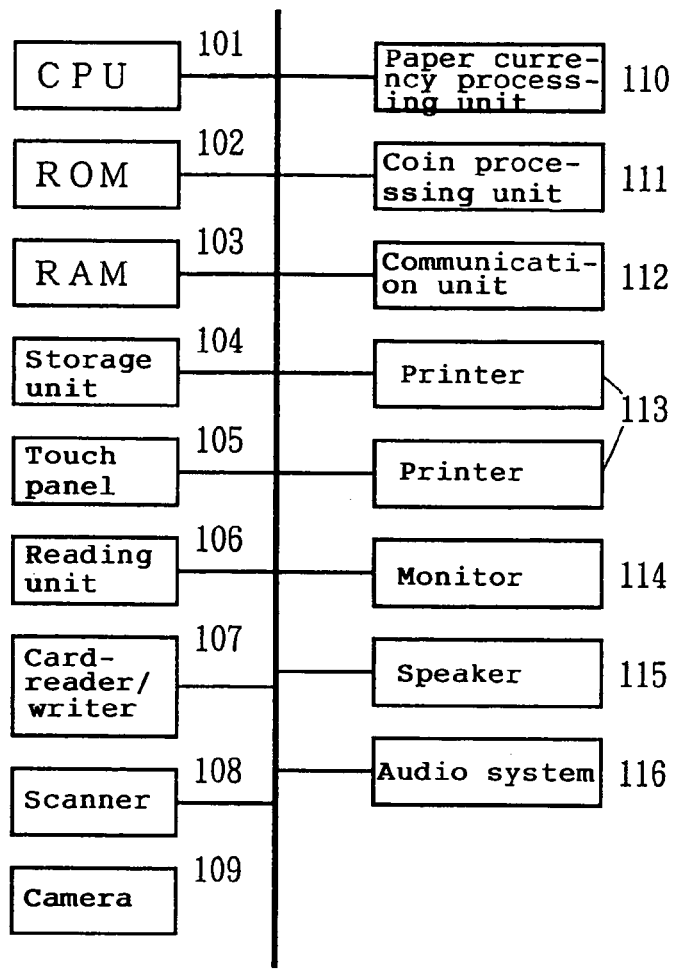
FIG. 2 is a block diagram of an arrangement of the printing station.

FIG. 2 is a block diagram of an arrangement of a printing station. In this printing station, a CPU 101 for performing data processing reads a program stored in a ROM 102 into a RAM 103 and controls the entire system. In ROM 102, various programs are stored, i.e. programs for performing basic processing as a printing station. For example, a control program for controlling processing to read image data and for controlling the entire system such as output processing, a program for performing various types of image processing such as solving of the problems in photographing under rear light or reflection light caused by inexperience or lack of skill of the photographer, automatic color correction for adjusting technical peculiarities of each digital camera, or for correcting unnecessary shadow, lack of color balance or correction of photographing failure, enlargement or size reduction of the image data, removal of noise, etc., or a program for communication processing. A storage unit 104 comprises components such as a hard disk where various types of application programs, image data and other necessary data are stored. A touch panel 105 is used by the user to perform input operation or a procedure to specify an image, etc. by finger touch. Naturally, other types of input means such as mouse, keyboard, etc. may be provided. A reading unit 106 is used to read the image data stored in various types of storage media of the digital camera, and it comprises a PC card, smart media, a compact flash device, a memory stick, an MO disk, a mini-disk, and drives for reading data such as CD-ROM. A card-reader/writer 107 reads data in various types of cards such as pre-paid card, debit card, or members card, and checks and identifies the user and performs charge processing or updates the data of the card. A scanner 108 is designed as flat-head type or sheet feeding type and is used to read photographs or printed manuscripts. A camera 109 is a photographing device to prepare a photograph for certification purpose. A paper currency processing unit 110 and a coin processing unit 111 are used to check and identify bills and coins thrown into the system, performs processing for the cost to be charged by comparing the cost required with the amount of bills or coins thrown into the system, and also gives small change when necessary. A communication unit 112 is used for giving or receiving data via a network to or from a management system which is to be described later. Two or more printers 113 are provided, and when two or more of the same type of storage media are set, data are transferred to each other and are printed. When different types of media are set, these are switched over and the data are printed. In this case, the printer used in the present invention is a thermal transfer printer. That is, a heat sublimation type (or heat melting type) ink layer is provided on a base film. From rear side of the base film, heat and pressure are applied at predetermined points using thermal head. From such points on the heat sublimation type (or heat melting type) ink layer as to correspond to the portion to be printed, ink is transferred to a material where image data are to be transferred and the image is printed out. In this case, in order that color difference does not occur between the printers, information of printing materials such as ribbons, paper, etc. is stored in a cassette, and this is read out and is controlled by CPU 101. A monitor 114 is a device to display the image thus read. A speaker 115 is used to provide audio guidance useful for operating the printing station. An audio unit 116 is to provide sound effect so that the user can operate and use the printing station in pleasant and cheerful manner.

Figure 3:
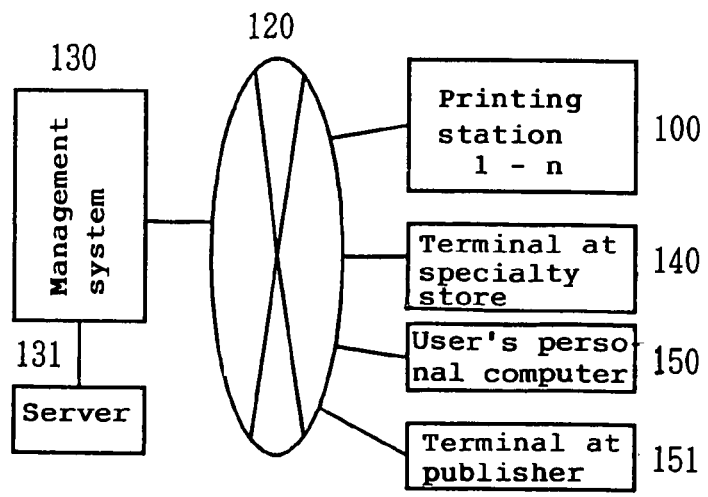
FIG. 3 is a diagram to explain a management system according to the present invention.

FIG. 3 is a drawing to explain a management system according to the present invention. Reference numeral 100 represents printing stations 1–n, and each station comprises the component arrangement as described in connection with FIG. 1 and FIG. 2. The image data taken at the printing station is sent via a network 120 to a management system 130 which comprises a host computer. For example, as shown in FIG. 4, it is now supposed that images A to I are displayed together on a screen when these are scrolled on a monitor screen 114 of the printing station 100 and also that the images A and F are specified for printing and the images C and G are specified for storage. Then, the images A and F are printed out and the images C and G are transferred to the management system 130, and the other images are erased from the storage medium. In particular, when it is necessary to print an image of high picture quality, the data may be transferred to a terminal 140 at a specialty store via the network 120 and may be printed there.

As shown in FIG. 5, an attribute information is attached to each image data (FIG. 5 (*a*)). The attribute information includes various types of information such as name, age, sex, occupation, address, and telephone number of the owner of the image data, category of image (such as an image of baby, a personal portrait, scenery, animal or plant, etc.), date of photographing, whether it is allowable for public disclosure or not, etc. (FIG. 5 (*b*)). The data are turned to database and are stored in a server 131. Therefore, the system serves as an image data bank, and this relieves the user from the burden to store the image data. It is also economical because an expensive storage medium can be used as many times as required. Further, anybody can have access to the image data allowable for public disclosure through a personal computer 150 in general use or through a terminal 151 at a publisher via a network, and the image data will be available to those who want to have the data upon payment of the predetermined amount of fee. It is needless to say that distribution of the data can be requested to the management system 130 from each of the printing stations and the necessary image data can be received.

The management system 130 performs management of status of each printing station and monitors remote-controlled maintenance, and also monitors operating conditions. For example, as shown in FIG. 6, the data such as the data of status (operating conditions) in each of the printing stations 1–n, the software used, the data of operating conditions (such as remaining stock of printer consumables) are permanently placed under management. When necessary, maintenance staffs may be dispatched to perform maintenance and inspection or to replenish the consumables. Each consumable item may be provided with a memory, and a specific code may be stored in it. By monitoring the code, it is possible to prevent incorrect use of inadequate consumable item. In case the software used is not updated, the software can be upgraded via the network.

As described above, according to the present invention, the needed data can be picked up from the image data taken by digital camera and can be printed in easy manner, and the necessary image data can be stored. For the users, this is very economical because the storage medium can be used as many times as required and also it is convenient because the user is alleviated from the burden to store the image data. Further, the image can be stored by turning to database, and anybody can search and utilize the image data which are opened to the public. Thus, the image can be effectively utilized from wider viewpoints and for more diversified purposes.

What is claimed is:

1. An image data management system, comprising:
   a plurality of printing stations with functions to read digital image data, to print the data by performing necessary image processing and to transmit or receive the image data;
   a management system connected to each printing station via a network and used for identifying management data of each printing station and for distributing necessary data to each printing station; and a server for turning the image data, being transmitted from each printing station to the management system, to a database and for storing the data, wherein said plurality of printing stations further comprises:
    a currency processing unit, wherein said currency processing unit identifies currency inserted into the system, processes a cost to be charged to a client, and returns currency to the client.

2. The image data management system according to claim 1, wherein said digital image data comprises digital image data received from a digital camera.

3. The image data management system according to claim 1, wherein said image processing comprises resolving a back light photograph, correcting automatic color for adjusting technical peculiarities of a digital camera, correcting shadow, correcting color balance, correcting photographic failure, enlarging or reducing a size of image data, and removing noise.

4. The image data management system according to claim 1, wherein said management system comprises a host computer and wherein said management system manages the status of each of the plurality of printing stations, monitors remote controlled maintenance of each of the plurality of printing stations, and monitors operating conditions of each of the plurality of printing stations.

5. The image data management system according to claim 1, wherein said plurality of printing stations further comprise a camera and an illuminating device, wherein a photographed image is obtained using the camera and the illuminating device.

6. The image data management system according to claim 1, wherein said plurality of printing stations are publicly located and wherein said image data stored in said database can be accessed via the printing stations by permitted public users.

7. The image data management system according to claim 1, wherein each of the plurality of printing stations comprise a plurality of printers.

8. An image data management system, comprising:
    a plurality of printing stations with functions to read digital image data, to print the data by performing necessary image processing and to transmit or receive the image data;
    a management system connected to each printing station via a network and used for identifying management data of each printing station and for distributing necessary data to each printing station; and
    a server for turning the image data, being transmitted from each printing station to the management system, to a database and for storing the data,
    wherein the image data turned to said database has image categories as attribute information, and
    wherein said attribute information further comprises a name, an age, a sex, an occupation, an address and a telephone number of an owner of the image data.

\* \* \* \* \*